US009070197B2

(12) United States Patent
Ulusoy et al.

(10) Patent No.: US 9,070,197 B2
(45) Date of Patent: Jun. 30, 2015

(54) OBJECT BASED SEGMENTATION METHOD

(76) Inventors: Ilkay Ulusoy, Ankara (TR); Orsan Aytekin, Ankara (TR)

( * ) Notice: Subject to any disclaimer, the term of this patent is extended or adjusted under 35 U.S.C. 154(b) by 205 days.

(21) Appl. No.: 14/002,708

(22) PCT Filed: Feb. 29, 2012

(86) PCT No.: PCT/TR2012/000039
§ 371 (c)(1),
(2), (4) Date: Oct. 13, 2013

(87) PCT Pub. No.: WO2012/118459
PCT Pub. Date: Sep. 7, 2012

(65) Prior Publication Data
US 2014/0050403 A1    Feb. 20, 2014

(30) Foreign Application Priority Data

Mar. 1, 2011    (TR) .............................. a 2011 01980

(51) Int. Cl.
*G06T 7/00*    (2006.01)
(52) U.S. Cl.
CPC ............. *G06T 7/0081* (2013.01); *G06T 7/0091* (2013.01); *G06T 2207/10032* (2013.01); *G06T 2207/20036* (2013.01); *G06T 2207/30181* (2013.01); *G06T 2207/30184* (2013.01)
(58) Field of Classification Search
USPC ......................................... 382/173, 257, 308
See application file for complete search history.

(56) References Cited

U.S. PATENT DOCUMENTS

| 5,987,158 | A | * | 11/1999 | Meyer et al. | 382/133 |
|---|---|---|---|---|---|
| 6,047,090 | A | * | 4/2000 | Makram-Ebeid | 382/257 |
| 7,630,550 | B2 | * | 12/2009 | Maroy et al. | 382/173 |
| 7,742,650 | B2 | * | 6/2010 | Xu et al. | 382/257 |
| 8,265,392 | B2 | * | 9/2012 | Wang et al. | 382/173 |
| 8,452,108 | B2 | * | 5/2013 | Walch | 382/203 |
| 8,488,863 | B2 | * | 7/2013 | Boucheron | 382/133 |

OTHER PUBLICATIONS

Akcay et al., Morphological Segmentation of Urba Structure, IEEE 1-4241-0712, May 2007, pp. 1-6.*
Pesaresi et al., A New Approach for the Morphological Segmentation of High Resolution Sattelite Imagery, IEEE 0196-2892, 2001, pp. 309-320.*
Jin et al., Automated Building Extraction from High Resolution Satellite Imagery in Urban Areas Using Structrual, Contexual and Spectral Information, EURASIP Journal on Applied Signal Processing, 2005, pp. 2196-2206.*

* cited by examiner

*Primary Examiner* — Ishrat I Sherali
(74) *Attorney, Agent, or Firm* — Gokalp Bayramoglu

(57) ABSTRACT

This invention is related to a method that enables the object based segmentation of especially air/satellite images that are displayed in high resolution. The aim of the invention is to determine automatically the borders of objects by using statistical, spatial and structural relationships/characteristics and also by using high resolution air/satellite image data. Another aim of the invention is to develop a method that can operate by being minimally affected by limiting aspects such as ambient light, weather conditions or resolution and that can provide the determination of an object as a whole instead of sensing it in pixels.

4 Claims, No Drawings

OBJECT BASED SEGMENTATION METHOD

TECHNICAL FIELD

This invention is related to a method that enables object based segmentation of especially air/satellite photographs that are viewed in high resolution.

STATE OF THE ART (BACKGROUND ART)

Various methods are being used in order to determine the borders of the objects in photographs in the state of the art. Some of these methods enable the segmentation of objects with the aid of frames in relation to determine the edges of the objects and the elements that separate these objects from other objects. Such a method is described in a PCT of a patent application numbered WO 2009/157946.

Similarly in a USA patent numbered US 2007/253609 a method that is used to separate heart tissue with segmentation is described.

It is aimed to carry out an information inference with 2 dimension with the said methods and generally sections are extracted to obtain 3 dimensional data and then the processes are repeated. However, it is impossible to understand the heights of objects when we only have one image data in our use.

Another example known in the state of the art is described in the Chinese Patent application numbered CN101706950A. In this application a method which divides large images into small pieces and then puts them back together after processing procedures are carried out in these small pieces, is described.

BRIEF DESCRIPTION OF THE INVENTION

The aim of the invention is to be able to determine the borders and outlines of objects automatically with the usage of statistical, spatial and structural features/relationships and with the usage of high resolution air/satellite image data. Another aim of the invention is to develop a method which enables to define the object as a whole instead of just a pixel and which can operate and work by being minimally affected by restricting elements such as ambient light, air conditions or resolution.

DETAILED DESCRIPTION OF THE INVENTION

The invention uses a single band of the image data. This said band can be a grayscale band or it can be different spectral bands. The image data carries out a process with each pixel group in order to primarily determine primitive structures.

Subsequently, the determination of the objects is provided by grouping the possible identical primitive structures together.

By this means for an object to be perceived as a different object from its own because a part of this said object being less brighter due to a height difference or due to having its own shadow will be prevented.

This invention comprises 4 main steps in its most basic form:

1. To draw out primitive structures formed by pixel groups which have homogeneous brightness values within themselves following morphologic operations and to deduce the spatial size of the primitive structures, Morphological opening and closing operations will be carried out by using an increasingly large disk type structuring elements. These operations will be carried out for each pixel until the first local maximum is reached and the diameter of the first local maximum structuring element and the type of opening/closing operation will be appointed as the attribute of that pixel.

All pixels with the same attributes are grouped together and primitive structures are obtained.

2. To establish primitive objects by measuring statistically the similarities of the primitive structures with their neighboring primitive structures and then regrouping the similar structures, The mean value and standard deviation of the primitive structures are calculated.

Each primitive structure will be matched with the neighboring primitive structure which has the closest standard deviation and the mean value to itself.

If any of the primitive structures are not matched with any of its neighboring structures that structure will be a meaningful and different structure from its neighboring structures. If it has been matched with at least one of its neighboring structures that structure will be deemed to be a more meaningful structure collectively together with its neighbors and by joining this structure with its matching neighbors a primitive object will be obtained.

3. The determination of the range at each pixel that shows change in terms of spatial size and brightness values of the primitive objects, The range value at a pixel will be determined as the standard deviation of the primitive object that contains the pixel.

The spatial size at a pixel is determined as the size (pixel count) of the primitive object that contains the pixel.

4. To filter the image by accepting that the spatial and range sizes of the primitive objects provide an estimate of the mean shift technique's bandwidths (range and spatial bandwidths) and to determine the preferred objects by grouping (segmenting) the pixels that belong to the same mode.

The mean shift method is dependent on estimating a density gradient. The thing that determines the segmenting resolution is the size of the bandwidths. The mean shift vector is the vector difference of the average of the points inside the bandwidths around the pixel at the test point and the said vector. The mean shift vector is proportional to the density gradient at that said point. The mean shift vector calculated iteratively converges to zero which addresses convergence point. It is deduced that the convergence point corresponds to a meaningful mode inside the tested picture or an object inside the picture. The pixels that establish connected components which converge to the same point and are within the range value of that point are grouped and segments are determined.

The four steps described above can be used for other spectral bands one after the other and it can also be used to determine separate segments for each band. In order to reach more meaningful results by comparing the segments in the separate bands that have been obtained, the data acquired can be combined.

It is possible to perform a segmentation procedure by separately applying the above mentioned steps for each frame of the video images that roll one after the other. Following this process the motion of an object can be determined by determining the relationship of each segment inside the frames to each other.

The invention claimed is:

1. An object based segmentation method for ensuring segmentation of objects in an image comprising;

carrying out morphological opening and closing operations until a first local maximum is obtained for each pixel by using an increasingly large disk type structuring elements;

appointing the diameter of the first local maximum structuring element and the type of opening/closing operation as the attribute of that pixel;

grouping all pixels with the same attributes together to obtain primitive structures in order to draw out primitive structures formed by pixel groups which have homogeneous brightness values within themselves following morphologic operations and to deduce the spatial size of the primitive structures;

calculating the mean value and standard deviation of the primitive structures;

matching each primitive structure with the neighboring primitive structure which has the closest standard deviation and mean value to itself, in order to establish primitive objects by measuring statistically the similarities of the primitive structures with their neighboring primitive structures and then regrouping the similar structures;

determining the range value at a pixel as the standard deviation of the primitive object that contains the pixel;

determining the spatial size at a pixel as the size (pixel count) of the primitive object that contains the pixel, in order to determine the range that shows change in terms of spatial size and brightness values of the primitive objects;

calculating the vectoral difference in relation to the pixel of the average of the points inside the bandwidths around the pixel at the mean shift test point and the segmentation resolution determined in proportion to the size of the bandwidths used with the mean shift method which is based on estimating the density gradient;

assuming that the zero convergence point corresponds to a meaningful mode inside the tested picture or an object inside the picture, grouping and determining the segments of the pixels that establish connected components which converge to the same point and which are within the range value of that said point, in order to filter the image by accepting that the spatial and range sizes of the primitive objects provide an estimate of the mean shift technique's bandwidths (range and spatial bandwidths) and to determine the preferred objects by grouping (segmenting) the pixels that belong to the same mode.

2. The object based segmentation method according to claim 1 further comprising the step of determining during the related matching with a neighboring primitive structure that a structure which cannot be matched with any neighboring structures is assumed to be a meaningful structure on its own being different from its neighbors.

3. The object based segmentation method according to claim 1 comprising the step of obtaining a primitive object by assuming that a structure is more meaningful collectively together with the matching neighbor structure if any of the primitive structures have been matched with at least one of its neighboring structures and by combining this structure with this neighboring matched structure or structures.

4. The object based segmentation method according to claim 2 comprising the step of obtaining a primitive object by assuming that a structure is more meaningful collectively together with the matching neighbor structure if any of the primitive structures have been matched with at least one of its neighboring structures and by combining this structure with this neighboring matched structure or structures.

* * * * *